United States Patent [19]

Spaargaren

[11] Patent Number: 4,564,090
[45] Date of Patent: Jan. 14, 1986

[54] SELF-CENTERING BRAKE ASSEMBLY INCORPORATING A BRAKE DRUM AND AUTOMATIC ADJUSTING MECHANISM

[75] Inventor: Robert Spaargaren, Granger, Ind.
[73] Assignee: Allied Corporation, Morristown, N.J.
[21] Appl. No.: 566,857
[22] Filed: Dec. 29, 1983
[51] Int. Cl.$^4$ ............................................. F16D 51/14
[52] U.S. Cl. ............................. 188/331; 188/79.5 GC
[58] Field of Search ............... 188/79.5 GE, 79.5 GC, 188/196 BA, 196 B, 325, 326, 327, 328, 329, 330, 331, 332, 333, 334, 340

[56] References Cited

U.S. PATENT DOCUMENTS 2,740,498  4/1956  Trahern ................................ 188/327
2,938,160  5/1960  Dombeck et al. ........... 188/196 BA
3,216,533  11/1965  Hagerty et al. .............. 188/196 BA Primary Examiner—Duane A. Reger
Assistant Examiner—Alvin Oberley
Attorney, Agent, or Firm—Ronald D. Welch; Ken C. Decker

[57] ABSTRACT

A self-centering brake assembly in which the leading shoe 12 and the trailing shoe 14 are connected in a duo servo braking mode. The connected ends of the shoes have an automatic adjuster comprising an adjuster lever return spring 70, an adjuster lever 74, a wire form link 76 and a pretension caged spring 78. The force of the adjuster lever return spring 70 and the placement of the wire form link 76 together with its pretension cage spring 78 develop a balanced force so that the moments about each anchored end of the shoe is substantially equal to 0. Shoes 12, 14 thus maintain concentricity of the brake shoe ring in relation to the brake drum 28.

10 Claims, 4 Drawing Figures

SELF-CENTERING BRAKE ASSEMBLY INCORPORATING A BRAKE DRUM AND AUTOMATIC ADJUSTING MECHANISM

BACKGROUND OF THE INVENTION

1. Field of the Invention

The invention relates to a self-centering brake assembly incorporating a brake drum and an automatic adjusting mechanism which maintains a centered relation of the brake shoes in reference to the brake drum.

2. Description of the Prior Art

The present invention utilizes a torque spider, i.e. two torque plates which are in flat face-to-face engagement at their inner brake mounting portion and are axially spaced apart at their outer peripheral portions. A primary brake shoe and a secondary brake shoe are connected together at one pair of adjacent ends through an automatically adjustable strut and at the opposite pair of adjacent ends, the brake shoes are selectively spreadable into engagement with the brake drum by means of a wheel cylinder. The actuated ends of the shoes are also the anchored ends of the shoes, with the anchoring occurring on selected abutments of the two torque plates. In one direction of drum rotation the two brake shoes anchor jointly on one of the anchoring abutments, and when the brake drum reverses rotation, the two brake shoes, acting as a shoe ring, anchor jointly on the other spreadable end of the shoe ring. The adjacent spreadable ends of the shoes each carry an anchor pin, and the anchor pins are received in complementary anchoring recesses of the two torque plates. The expandable strut which connects the articulated ends of the shoes includes a serrated adjuster wheel, an adjuster lever, an adjuster lever return spring and an overtravel spring. The automatic adjuster functions during reverse braking by rotating a serrated turnable wheel to lengthen the strut and thus compensate for overtravel of the secondary brake shoe.

The problem to be overcome by the present invention is that the force matrix developed by the adjuster lever return spring and the overtravel spring which acts on the adjuster lever tends to cause an unbalance in the shoe ring when the brakes are unactuated or at rest that biases the shoes against the drum and mispositions the shoe ring from concentricity with the drum.

The problem addressed by the present invention is that the force system acting upon the shoes during brake adjustment must function to adjust the brake shoes, but once the actuating force developed upon the shoes, as well as the anchoring forces, are relieved, the spring forces which are component parts of the automatic adjuster must bias the shoe ring into a retracted position concentric with the drum. The described operation will result only when there is a balance of forces wherein moments taken about the anchor pins are self canceling to equal approximately zero. The strategy of the present invention is to balance the moments about each of the anchor pins so that the sum of these moments equal approximately zero because of the arrangement of the force system, consisting of the adjuster lever return spring and wire form link. It has been found by accurately analyzing and then disposing the components of the adjuster, i.e. the lever, the adjuster lever return spring, wire form link, and overtravel spring, it is possible to develop an accurate location for these components with the result that the sum of the moments about each of the anchor pins is substantially zero.

A distinct advantage of the present invention is that the application adjuster of the present invention has a reduction in the number of component parts from five or six, which is typical of that of the prior art, to a total number of four making it easier to assemble and to follow the contour of the brake drum. Because the brake follows the contour of the brake drum, it permits larger hub areas for front brake drum applications and conversely enables smaller duo-servo brakes on the rear of the vehicle. It should be understood that while the present invention finds its maximum utility with a due-servo double anchor torque spider brake, it also finds application in a duo-servo single anchor design with the backing plate being suitably modified for such installation.

SUMMARY OF THE INVENTION

The improved self-centering brake assembly is characterized in that the automatic adjuster consists of an adjuster lever pivotally mounted on the secondary shoe with a pawl which engages successive teeth of the adjuster wheel, an adjuster lever return spring fastened between the primary shoe and the adjuster lever, a solid form link and overtravel spring connected between the adjuster lever and torque plate and disposed so that it develops a force of such magnitude on the adjuster lever and shoes and along a force line to create, together with the force exerted by the adjuster lever return spring, a net balance of all said forces exerted on the shoes about their anchors whereby the shoe ring will remain centered when the brakes are unactuated and at all phases of adjustment in relation to the surrounding brake drum.

BRIEF DESCRIPTION OF THE DRAWINGS

The invention will now be described with reference to the accompanying drawings wherein.

DESCRIPTION OF THE PREFERRED EMBODIMENT

Figure 1:
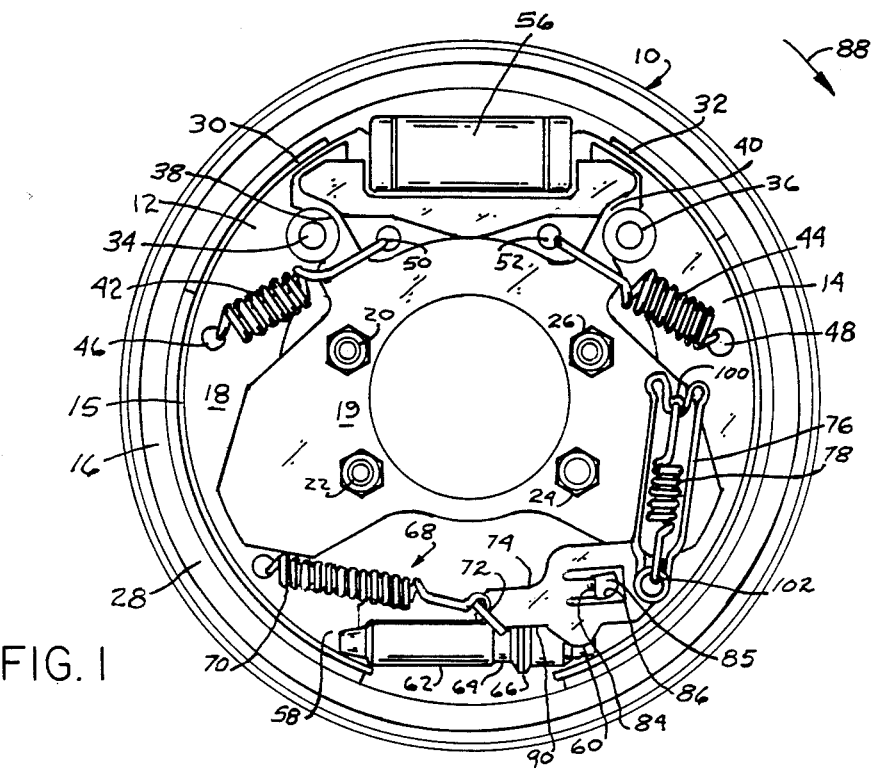
FIG. 1 is a side elevation view of a brake incorporating the present invention therein.
Figure 2:
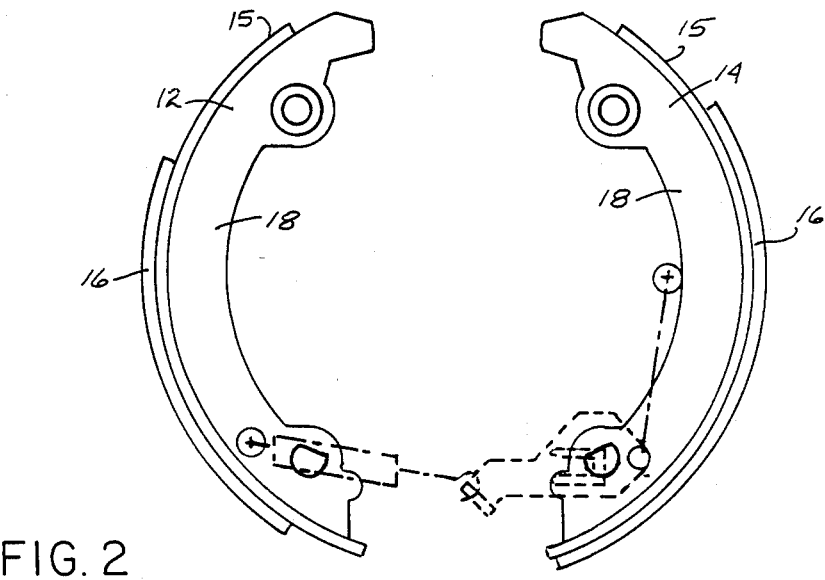
FIG. 2 is a detail view showing the leading shoe and trailing shoe removed from the torque plate and separated to illustrate the components which are required to be balanced about each of the anchor pins.

The invention is illustrated in use with a vehicle brake 10 having a pair of articulated brake shoes, one shoe being designated as the primary shoe 12 and the other as the secondary shoe 14. The shoes are essentially identically constructed and each consists of arcuate rim 15, friction liner material 16 and a strengthening web 18. The shoes are mounted and anchored on a duo-servo dual anchor torque spider 19 consisting of two plates which are in flat face-to-face engagement at their inner periphery and are held by a series of bolts 20, 22, 24, 26 onto a fixed part of the vehicle. At their outer periphery the plates diverge in order to receive portions of the shoe webs therebetween so that the shoes are loosely held in an axial sense while still permitting free radial movement into and out of engagement with a surrounding brake drum 28. At the upper adjacent pair of shoe ends 30, 32 the shoes are both anchored and actuated. The anchoring function is obtained by means of anchor pins 34, 36. Anchors 34, 36 are contoured to engage the plates within concave complementary anchoring recesses 38, 40 so that the confronting curvilinear portions of the anchor pin and recess will distribute the load over a sufficient area so as to reduce the braking pressures to acceptable levels.

It should be noted that the torque plates overlie opposite sides of the shoe webs 18 at the uppermost part of the respective shoes in order to guide them and limit their axial movement, while still maintaining a free combination of circumferential and radial movements so that the brake shoes can perform the normal functions of being moved out into engagement with the drum during brake operation and then returning to their positions illustrated in FIG. 1. The shoes are held in normally retracted position by means of shoe return springs 42, 44 which are stretched between openings 46, 48 in the shoe webs and shoe retaining openings 50, 52 in the torque plates.

The shoes are selectively engageable with the drum by energizing wheel cylinder 56 having a pair of oppositely actuated pistons (not shown) and which act on the ends 30, 32 of the shoes, causing them to spread apart.

At articulated ends 58, 60 of the shoe ring is a strut 62 having internally threaded opening which recieves a threaded stem 64 having an attached serrated wheel 66 so that by rotating the serrated wheel 66 the stem 64 will advance out of the strut 62 thus elongating the connection between the shoe ends 58, 60 and compensating for shoe wear.

The automatic adjusting funtion is accomplished by means of an automatic adjuster designated generally by reference numeral 68 and consisting of only four components: (a) an adjuster lever return spring 70 fastened between end 59 of primary shoe 12 and an upturned flange 72 of (b) an adjuster lever 74, (c) a wire form link 76 and (d) a pretensioned caged spring 78. The adjuster lever has an integrally related tab 86 fitted into an opening 85 on the web 18 in shoe 14 and serves as a pivot connection 84 for the adjuster lever 74 which rotates during adjustment against the resistance of spring 70.

The construction details of the wire form cage or link 76 are disclosed fully in co-pending application titled "IMPROVED OVERTRAVEL DEVICE FOR AN AUTOMATIC BRAKE ADJUSTER", U.S. Ser. No. 562,127 filed Dec. 16, 1983 and assigned to the same assignee as the present application.

The automatic brake adjuster functions during reverse braking, that is, when the vehicle is moving in a direction causing the brake drum to move clockwise in the direction of the arrow 88. The trailing shoe 14 moves outwardly toward the drum with the anchored end 36 moving away from its arcuate abutment and both shoes anchor as a whole shoe ring on anchor 34 of the leading shoe. The described movement of the trailing shoe causes the adjuster lever to rotate counterclockwise about its pivot 84 consisting of a tab received in the shoe web opening 85. Counterclockwise rotation causes the pawl 90 to "unwind" or advance the stem 64 out of the strut 62. This described rotation of the adjuster lever occurs against the resistance of the spring 70. When the brake actuating forces are relieved, the adjuster lever return spring 70 returns the adjuster lever to its initial position and such movement continues until the force system is completely balanced.

This system is protected by the overtravel caged spring 78, in that if the adjuster lever 74 is unable to rotate the serrated wheel, the secondary shoe movement instead of causing the adjuster lever to rotate counterclockwise about 84 will remain fixed and the shoe and adjuster lever will move and overcome the force of the overtravel spring 78. It should be understood that this particular feature is not a part of the present invention but is fully disclosed in "IMPROVED OVERTRAVEL DEVICE FOR AN AUTOMATIC BRAKE ADJUSTER" (supra).

Figure 3:
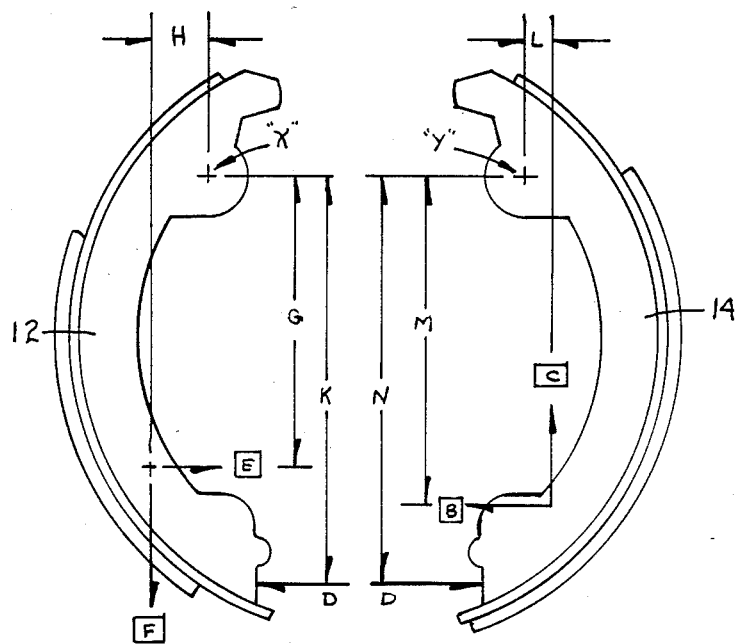
FIG. 3 illustrates the leading shoe and trailing shoe as part of a free-body force diagram with superimposed forces and their directions on the leading shoe and trailing shoe; and, FIG. 4 illustrates a detail view of the adjuster lever as part of a free-body diagram, the applied forces being identified in boxes.
Figure 4:
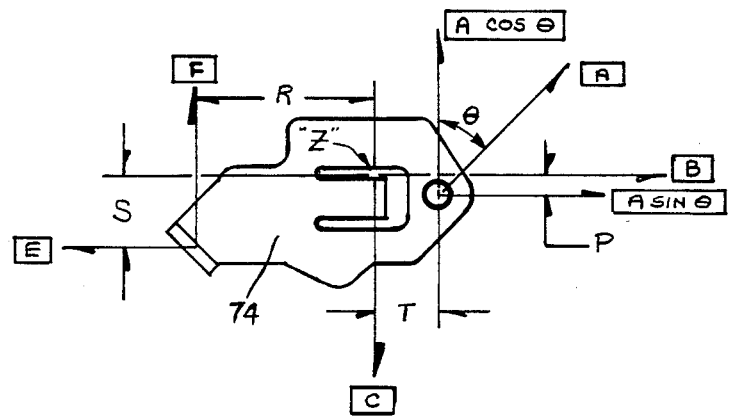

Referring now to FIGS. 3 and 4, the force system generated by the described automatic adjusting functions, develops forces which can be analyzed by reference to a free force body diagram of the leading shoe 12, trailing shoe 14, and adjuster lever 74, the applicable forces being illustrated in boxes. The diagram is illustrative of the forces when the brake is at rest or unactuated. Accordingly, since the shoes 12, 14 are symetrical and springs 42, 44 are identical but operatively oppositely disposed, the forces resulting from the springs 42, 44 are balanced and cancelled. The forces labeled "E" and "F" on both the adjuster lever 74 and leading shoe 12, illustrate the forces from adjuster lever return spring 70. The forces labeled "B" and "C" on the adjuster lever 74 and trailing shoe 14 illustrate the force components transmitted between the trailing shoe 14 and the adjuster lever 74 at the fulcrum or pivot point 84 (point "Z") of the adjuster lever 74.

Forces illustrated A cos θ and A sin θ and the force "A" define forces from the wire form link 76 and overtravel spring 78. the forces denoted "D" are the reactive forces exerted by the opposite ends of the strut 62.

Applying the distances "G", and "H" which illustrate the coordinate distances from the anchor to the point of attachment for the adjuster lever return spring and "K" the distance from the anchor to the thrust point on the leading shoe, the strategy of the present invention is to determine the force magnitude and location by which it is possible to balance the moments about each of the anchor pins 34, 36. When the calculated sum of the moments about each anchor pin equals approximately 0, then the proper length of the link 76 and the proper angle of the adjuster spring 70 can be established such that the brake adjuster forces are balanced throughout the life of the brake and the shoe cage is biased neither into or out of engagement with the brake drum. Utilizing this approach, there is first derived, equation (1)

Leading Shoe $$\circlearrowleft \Sigma M_x = 0 = (E)(G) + (F)(H) - (D)(K) \rightarrow \quad (1)$$

$$D = \frac{(E)(G) + (F)(H)}{(K)}$$

Considering next a force analysis for the adjuster lever, with forces "E" and "F" of the same magnitude as those for the leading shoe, forces "C" and "B" and the same forces illustrated for the trailing shoe and forces A cos θ and A sin θ illustrate the wire form link overtravel spring combination. These equations are developed solving for "A" in the following analysis:

Lever $$\overset{\curvearrowleft}{+}\Sigma M_z = 0 = (A)\cos\theta(T) + (A)\sin\theta(P) - (E)(S) - (F)(R) \quad (2)$$

$$\Sigma F_x = 0 = (B) - (E) + (A)\sin\theta \rightarrow B = (E) - (A)\sin\theta \quad (3)$$

$$\Sigma F_y = 0 = (F) - (C) + (A)\cos\theta \rightarrow C = (F) + (A)\cos\theta \quad (4)$$

Solve for "A"

$$(A)\cos\theta(T) + (A)\sin\theta(P) = (E)(S) + (F)(R)$$

$$A = \frac{(E)(S) + (F)(R)}{\cos\theta\,(T) + \sin\theta\,(P)} \quad (5)$$

$$(3)(F)(L)(T)\cos\theta + (F)(L)(P)\sin\theta + (E)(S)(L)\cos\theta + (F)(R)(L)\cos\theta + \frac{(E)(G)(N)(T)}{(K)}\cos\theta + \frac{(F)(H)(N)(P)}{(K)}\sin\theta -$$

$$(E)(M)(T)\cos\theta - (E)(M)(P)\sin\theta + (E)(S)(M)\sin\theta + (F)(R)(M)\sin\theta + \frac{(E)(G)(N)(P)}{(K)}\sin\theta + \frac{(F)(H)(N)(T)}{(K)}\cos\theta = 0$$

$$(4)\sin\theta\left[(F)(L)(P) + \frac{(F)(H)(N)(P)}{(K)} - (E)(M)(P) + (E)(S)(M) + (F)(R)(M) + \frac{(E)(G)(N)(P)}{(K)}\right] +$$

$$\cos\theta\left[(F)(L)(T) + (E)(S)(L) + (F)(R)(L) + \frac{(E)(G)(N)(T)}{(K)} - (E)(M)(F) + \frac{(F)(H)(N)(T)}{(K)}\right] = 0$$

$$(5)\sin\theta\left\{F\left[(L)(P) + (R)(M) + \frac{(H)(N)(P)}{(K)}\right] + E\left[-(M)(P) + (S)(M) + \frac{(G)(N)(P)}{(K)}\right]\right\} =$$

$$-\cos\theta\left\{F\left[(L)(T) + (R)(L) + \frac{(H)(N)(T)}{(K)}\right] + E\left[(S)(L) - (M)(T) + \frac{(G)(N)(T)}{(K)}\right]\right\}$$

$$(6)\frac{\sin\theta}{\cos\theta} = -\frac{F\left[(L)(T+R) + \frac{(H)(N)(T)}{(K)}\right] + E\left[(T)\left(\frac{(G)(N)}{(K)} - (M)\right) + (S)(L)\right]}{F\left[(P)\left(\frac{(H)(N)}{(K)} + (L)\right) + (R)(M)\right] + E\left[(M)(-P + S) + \frac{(G)(N)(P)}{(K)}\right]}$$

But $\frac{\sin\theta}{\cos\theta} = \tan\theta$

Referring next to the trailing shoe, and again solving a series of equations for which there is set the balance of moments about the anchor pins at approximately 0, the free body diagram for the trailing shoe consists of the analysis:

Trailing Shoe $$\overset{\curvearrowleft}{+}\Sigma M_y = 0 = (C)(L) + (D)(N) - (B)(M) \quad (6)$$

Subst. Eq (3) & (4) & (1) into (6)

$$(1)(F)(L) + (A)\cos\theta\,(L) +$$

$$\left[\frac{(E)(G) + (F)(H)}{(K)}\right](N) - (E)(M) + (A)\sin\theta\,(M) = 0$$

Subst. in Eq. (5)

$$(2)F(L) + \frac{[E(S) + F(R)]\cos\theta(L)}{\cos\theta(T) + \sin\theta(P)} + \frac{(E)(G)(N)}{K} +$$

$$\frac{(F)(H)(N)}{(K)} - (E)(M) + \frac{[F(S) + F(R)]\sin\theta(M)}{\cos\theta(T) + \sin\theta(P)} = 0$$

Mult. by $[\cos\theta(T) + \sin\theta(P)]$

Since $\sin\theta/\cos\theta = \tan\theta$, the following expression for the angle $\theta$ can be solved, this being the angle that the link 76 must be positioned in order that all moments about the anchor pins 34, 36 will equal 0.

$$\rightarrow \theta = -\arctan\left[\frac{F\left[(L)(T+R) + \frac{(H)(N)(T)}{(K)}\right] + E\left[(T)\left(\frac{(G)(N)}{(K)} - (M)\right) + (S)(L)\right]}{F\left[(P)\left(\frac{(H)(N)}{(K)} + (L)\right) + (R)(M)\right] + E\left[(M)(S - P) + \frac{(G)(N)(P)}{(K)}\right]}\right]$$

The foregoing design and its analysis is optimally designed for use with a double anchor torque spider brake for the reason that such design lends itself to hooking the wire form link 76 at any convenient location onto the torque spider 19. However, it should be understood that the invention is not so limited, and can be adapted to a duo servo single anchor design with suitable modification of the torque plate 19.

The present invention is an effective solution to the problem as to where to hook the wire form link onto the torque plate, i.e. the appropriate location for the attachment point 100. Utilizing the analysis of the present invention, it is possible to solve for the angle $\theta$ which is the angle which the wire form link makes to a horizontal line drawn through the attachment point 102 with the adjuster lever 74. The described mathematical analysis takes into account the rate and angle of the adjuster lever return spring 70, length of the shoes, and the rate and size of the wire form link 76 overtravel spring 78.

It is thus possible, throughout the lining life of the brake of the duo servo type described, to optimize the location of the attachment point of the link to the torque spider and achieve a virtually precise balancing of moments about the anchor pins 34, 36. Once having established the proper length of the link 76 and its angle $\theta$, the brake assembly is balanced throughout the life of the brake and the shoes are unbalanced neither in an applied or retracted position by the adjuster components in their normal operation. Thus I have achieved not only a reduction in the number of components required for an application adjuster, but also have achieved a precise strategy for locating these components for a balanced brake operation.

Although the present invention has been illustrated and described in connection with a single example embodiment, it should be understood that this is illustrative of the invention and is by no means restrictive thereof. It is reasonably to be expected that those skilled in this art can make numerous revisions and adaptations and it is intended that such revisions and adaptations will be included within the scope of the following claims as equivalents of the invention.

I claim:

1. A self centering brake assembly incorporating a brake drum and an automatic adjusting mechanism which maintains centered relation of the brake in reference to the brake drum, comprising:

A torque spider consisting of two torque plates disposed in flat face-to-face engagement at their inner brake mounting surfaces and axially spaced apart at their outer peripheral portions;

a primary brake shoe and a secondary brake shoe each having a friction material lined rim and a web loosely fitted between the torque plates at their outer periphery and forming a shoe ring;

a moveable anchor secured one to each of the expandable shoe ends and engageable with complementary anchoring seats provided by outer peripheral portions of said torque plates;

a wheel cylinder for expanding the actuated ends of said shoes; and, an automatic adjuster for extending the distance between the articulated shoe ends responsively to shoe overtravel; characterized in that the automatic adjuster consists of a serrated adjuster wheel, an adjuster lever pivotally mounted on the secondary shoe and having a pawl which engages successive teeth of the adjuster wheel, an adjuster lever return spring fastened between the primary shoe and the adjuster lever, a solid form link and overtravel spring connected between the adjuster lever and torque plate and disposed so that it develops a force of such magnitude on the adjuster lever and shoes and along a force line to create together with the force exerted by the adjuster lever return spring a net balance of all said forces exerted on the shoes about their anchors whereby the shoe ring when the brake is unactuated will remain centered at all phases of adjustment in relation to the surrounding brake drum.

2. The brake assembly in accordance with claim 1 wherein said adjuster lever includes an integrally related struck portion which is passed through a complementary opening at the end of the secondary shoe to provide a pivot for angular movement of said lever.

3. The brake assembly in accordance with claim 1 in which the force matrix developed on the primary and secondary shoes and derived from said adjuster lever return spring is opposed by the overtravel spring and link to develop a combination of forces on said shoe ring maintaining the shoe ring in concentric relation with the surrounding drum at all adjusted positions of the shoes.

4. The brake assembly in accordance with claim 1, including a shoe return spring fastened one between each of the expandable ends of the primary and secondary shoe ends and the torque plate to maintain the shoe ends in normal position with the shoe anchors held against complementary anchoring recesses of said torque plate.

5. The plate assembly in accordance with claim 1 including a wheel cylinder having two oppositely biased pistons and a variable volume hydraulic pressure chamber between said pistons, the adjacent expandable ends of the secondary shoes being spread by means of said wheel cylinder.

6. The brake assembly in accordance with claim 1 wherein said two torque plates diverge at the anchored ends of the shoes and form axially spaced apart torque abutments proportioned to receive the anchor pins therein.

7. A method for developing a substantially balanced force system on a pair of interconnected primary and secondary brake shoes having one adjacent pair of interconnected adjustable shoe ends and an opposite adjacent pair of spreadable and anchorable ends, comprising the steps of connecting the one pair of shoe ends through an adjustable strut having a connected, internally threaded sleeve and strut with a serrated adjusted wheel which develops turning of the strut relative to the sleeve, mounting an adjuster lever onto the secondary shoe for pivotal operation and with a pawl positioned to engage the serrated wheel to adjustably turn the wheel upon shoe overtravel, biasing the adjuster lever in a direction opposed by means of a spring stretched between the primary brake shoe and adjuster lever, and imposing a turning force on said adjuster lever during shoe overtravel by means of a solid cage and cage spring positioned between the torque plate and adjuster lever and having a force direction and magnitude which, together with the force developed by the adjuster lever return spring effects a balanced force matrix on the brake shoes about their anchored ends when the brake assembly is unactuated ensuring concentricity of the brake shoe ring in relation to an engageable brake drum surface when the brake is unactuated.

8. The process in accordance with claim 7 including the steps of:

yieldably drawing the expandable ends of the primary and secondary shoes against complementary anchoring surfaces of a torque plate and selectively expanding the adjacent spreadable ends of the brake shoes against the resistance of such yieldable drawing force.

9. The process in accordance with claim 7 including the steps of progressively ratcheting the serrated wheel by shoe overtravel movement to expand the distance between the connected primary and secondary shoe ends and thereby compensating for shoe overtravel which develops during shoe wear.

10. The process in accordance with claim 7 in which the continuously centered position of the connected shoes in relation to the opposed drum braking surface obviates brake drag.

* * * * *